Jan. 24, 1961   L. KRAMER   2,969,088
PILOT VALVE
Filed March 16, 1956   2 Sheets-Sheet 1
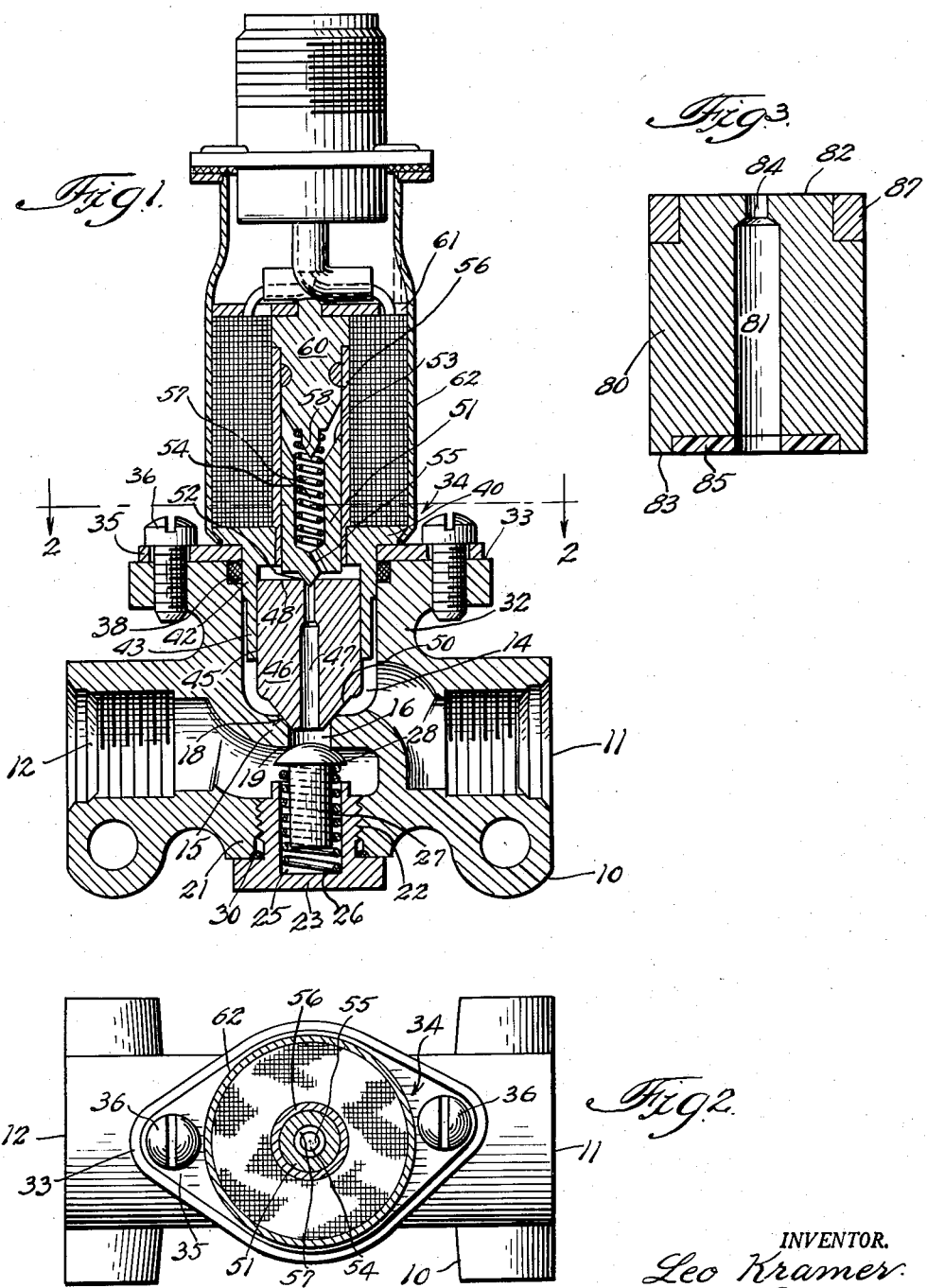
INVENTOR.
Leo Kramer

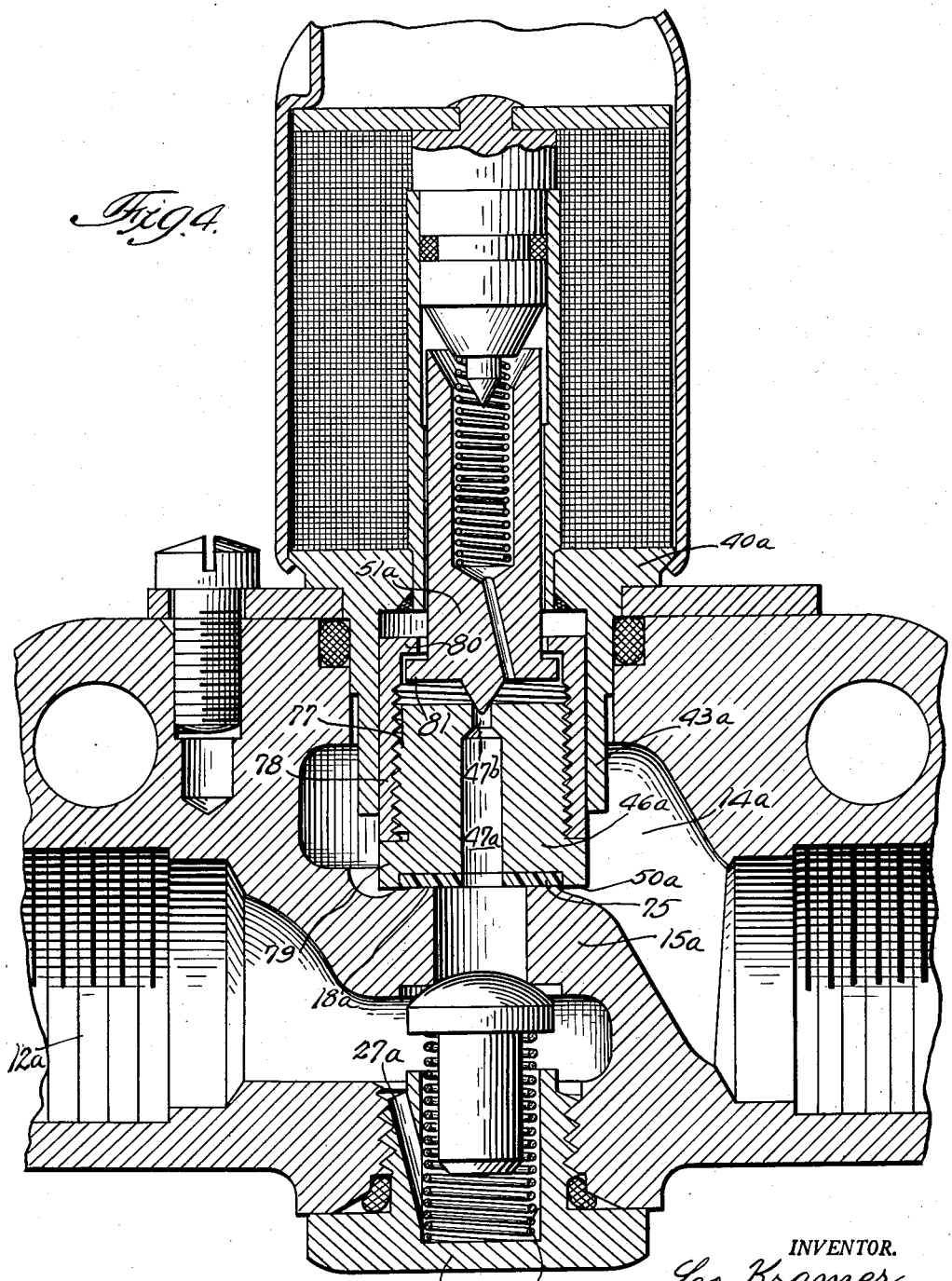

United States Patent Office 2,969,088
Patented Jan. 24, 1961

2,969,088
PILOT VALVE

Leo Kramer, Bensenville, Ill., assignor to Controls Company of America, Schiller Park, Ill., a corporation of Delaware Filed Mar. 16, 1956, Ser. No. 572,075

6 Claims. (Cl. 137—614.2)

This invention relates to a pilot valve, and particularly to a pilot valve construction which inherently is lightweight and compact and may be manufactured in quantity without expensive tooling. The pilot valve embodying the present invention has a desirable characteristic of including as a part thereof, if desired, a check valve to prevent reverse flow. The new pilot valve may be provided with the check valve, or the check valve may be omitted and in such event the new valve is adapted to control fluid flow therethrough in either direction through the valve structure. In addition to the above desirable characteristic, the new pilot valve may be so constructed that in the open position thereof, minimum force for maintaining the valve open is required. Other desirable advantages and characteristics will appear in connection with the drawing and description of the valve, wherein exemplary embodiments of the invention are described, it being understood that variations may be made without departure from the scope of the invention except as defined by the appended claims.

Fig. 1 is a sectional view of a valve embodying the present invention;

Fig. 2 is a section on line 2—2 of Fig. 1;

Fig. 3 shows a modified plunger which may be used; and

Fig. 4 is a sectional view of a modified valve.

Referring first to the form of the invention illustrated in Figs. 1 and 2, the valve comprises housing 10 of suitable material. The housing may be made of brass, aluminum or any other metal, or may be made of rigid plastics such as Bakelite or the like having suitable mechanical and chemical properties. Housing 10 has inlet 11 and outlet 12, these being in aligned relation, although any other disposition of the inlet and outlet channels may be provided. Inlet 11 and outlet 12 are shown as threaded but may be left smooth, depending upon how the pipes are to be connected thereto.

Inlet 11 of the housing communicates with cylindrical chamber 14 and is separated from outlet 12 by partition 15 having valve passage 16 therethrough.

Partition 15 has valve seat 18 formed at the high pressure end of passage 16, this being the end leading to chamber 14. Partition 15 also has valve seat 19 formed at the low pressure end of passage 16, this being the end of the passage communicating directly with outlet 12.

Valve seat 18 constitutes the main valve seat for the valve structure and is made accurately and may be bevelled as illustrated. If desired, valve seat 18 may be formed from a separate insert of suitable material having desired hardness.

Valve seat 19, which is the valve seat for a check valve, when used, may have any suitable shape and is here illustrated as having a sharp edge. Valve body 10 has portion 21 facing passage 16. Portion 21 is drilled and threaded at 22 to accommodate plug 23 having suitable threading to cooperate with threaded portion 22. The axis of plug 23 is in line with the axis of passage 16. Plug 23 is recessed at 25 and has disposed therein coil spring 26 supporting mushroom-shaped check valve member 27 having enlarged rounded head 28.

Head 28 is engaged by the end of coil spring 26 and is urged thereby against check valve seat 19. To provide a fluid-tight seal between plug 23 and body portion 21 gasket 30 is provided. When no check valve is desired, valve member 27 and coil spring 26 may be omitted.

Valve housing 10 has body portion 32 forming the annular wall of cylinder 14. Body portion 32 has finished face 33, cylindrical chamber 14 extending inwardly from this face. Bolted against face 33 is an assembly generally indicated by 34. Assembly 34 includes apertured mounting plate 35 having a smooth face opposed to face 33 of the valve body. Mounting plate 35 is bolted to the valve body by a series of bolts 36 passing through apertures in plate 35 and engaging threaded apertures in body portion 32. Bolts 36 are disposed at spaced intervals along the arc of a circle and as many bolts may be provided as necessary. A fluid-tight seal is provided by gasket 38 disposed in an annular undercutting of body portion 32.

Mounting plate 35 has permanently attached thereto base plate 40 overlying mounting plate 35. Mounting plate 35 is apertured to register with the circular cross-section of base plate 40. Base plate 40 has depending portion 42 extending downwardly through the aperture in mounting plate 35 and into chamber 14. Depending portion 42 cooperates with the undercut annular region in body portion 32 to retain gasket 38 to provide a fluid-tight seal. Depending portion 42 supports skirt portion 43 extending downwardly from portion 42, as seen in Fig. 1, into chamber 14. Depending portion 42 and skirt 43 have a smooth inner cylindrical bore 45, which bore is carefully controlled as to diameter.

Slidably disposed within bore 45 is piston 46. Piston 46 has its outer diameter carefully dimensioned so that a predetermined annular pilot clearance around piston 46 within bore 43 is provided. Piston 46 may be made of any suitable material, either metal or non-metal, such as a plastic. In particular, certain plastics, such as nylon or Kel–F (polytrifluorochloroethylene) or Teflon (polytetrafluoroethylene) may be used. Piston 46 has axial channel 47 extending therethrough from top end 48, which may be flat, as illustrated in the drawing, to bottom end 50 tapered to provide a conical surface for cooperation with valve seat 18. In regard to conical portion 50 of piston member 46 and valve seat 18, if both are metal, it is preferred to have one of the materials softer than the other. If portion 50 of piston 46 is of a suitable plastic, then valve seat 18 may be of any metal such as brass, aluminum or iron, all of which are usually harder than plastics. It is of course possible to have two plastics working against each other.

Cooperating with the top end of bore 47 of piston 46 is pilot valve member 51 having valve tip 52 for entry into the top end of channel 47. It is understood that valve tip 52 and the top end of bore 47 will generally have the physical hardness characteristics set forth previously in connection with valve portion 50 and valve seat 18; one being preferably harder than the other. Thus, if piston 46 is of a plastic material as a plastic insert at the top, then valve tip 52 may be of metal such as iron.

Pilot valve member 51 is preferably of soft iron or other ferromagnetic material and has a generally cylindrical shape. The top thereof is countersunk at 53 and gives access to cylindrical chamber 54 within the interior of the valve member. For equalizing pressure within chamber 14 of the valve body and within chamber 54 of the pilot valve member, there is provided fine passage 55 through the bottom end of the pilot valve member. Pilot valve member 51 is slidably disposed within nonmagnetic sleeve 56 rigidly attached to base plate 40. Pilot valve member 51 is biased downwardly to a closed position, as seen in Fig. 1, by coil spring 57 disposed within chamber 54, the top end of the coil spring being anchored against rounded tip 58 of ferromagnetic core 60. Core 60 forms part of an electromagnet generally indicated by 61 and including as a part thereof casing 62. A suitable winding is disposed around coil 60 and a portion of sleeve 56 within casing 62. Core 60 has its bottom end tapered to complement the countersinking 53 at top of the pilot valve member.

The entire electromagnet assembly, including core 60, functions to operate pilot valve member 51. Instead of an electromagnet, manual means may be provided or any other means such as, for example, a Sylphon bellows arrangement. In the case of an electromagnet assembly, it is generally difficult and impractical to exercise a graduated control over the upward movement of the pilot valve member. Where precise control over the position of the pilot valve member throughout the range of travel is required, other means such as manual means or a Sylphon arrangement or suitably designed electromagnetic means may be provided.

Where an electromagnet assembly is provided, as illustrated, it may be desirable to have casing 62 and base plate 40 of soft iron or other magnetic material.

The operation of the valve is as follows:

As illustrated in Fig. 1, the valve and check valve are shown as closed. The pilot valve member is also closed. Assuming that fluid under suitable pressure is available at inlet 11, some fluid will leak through the annular pilot clearance between skirt 43 and piston 46 and will enter chamber 14 above the top end 48 of the piston.

Inasmuch as the pilot valve is closed, there will be no flow of fluid through the annular pilot clearance opening and equal static pressure will exist at both ends of piston 46.

Now let it be assumed that pilot valve member 51 is raised to open the pilot valve consisting of tip 52 and the top end of channel 47. Assuming the pilot valve member is opened far enough and assuming that the check valve is properly designed, some fluid will flow through channel 47, through the check valve and into outlet 12. As soon as fluid flows through channel 47, the flow resistance of the annular pilot clearance between skirt 43 and piston 46 will result in a fluid pressure drop at the annular piston clearance, whereby a reduced pressure is created at the top face 48 of the piston. It is understood that channel 47 has a fluid flow resistance low in comparison to that of the annular pilot clearance. The pressure against the upstream portion of tapered bottom end 50 of the piston will be that of the inlet. Thus, there will be a difference of fluid pressure between the bottom and top ends of piston 46. Fluid pressure available at intake 11 will force piston 46 upwardly to open the main valve.

By careful control of the pilot clearance opening around piston 46 inside of skirt 43, by controlling the fluid flow resistance characteristic of the surfaces forming this clearance opening, by controlling the axial length of the clearance opening, desirable valve operating characteristics of the entire construction may be obtained. Where a check valve is provided, as illustrated in Fig. 1, the amount of bias of the check valve will also be a factor. If the check valve is omitted, the inlet and outlet may be reversed. In such case, static fluid pressure will be applied to bore 47.

The check valve creates a back pressure at check valve seat 19, and control of the spring bias on the check valve provides a control over the pressure drop characteristics of the entire valve.

Referring now to Fig. 4, a modified construction of the piston and pilot valve member is illustrated. In this modification, piston 46a has bottom portion 50a provided with insert 75 for cooperation with valve seat 18a in partition 15a. This insert may be of plastic, since cold flow is prevented. It will be noted that valve seat 18a lies in a plane generally perpendicular to the line of movement of piston 46a. Piston 46a has channel 47a through the same, the top part of the channel being smaller at 47b to provide a pilot valve seat. Piston 46a has threaded outer surface 77 which receives threaded sleeve 78. Sleeve 78 may be drawn up tightly so that the free edge of sleeve 78 bears against shoulder 79 of piston 46a. Sleeve 78 has shoulder 80 which overlies flange 81 on pilot valve member 51a. Sleeve 78 has its outer surface finished to provide a desired annular pilot clearance channel between it and skirt 43a.

It is necessary that a fluid flow path be provided from the top of chamber 14a to the region inside of sleeve 78 and above the top face of piston 46a. Accordingly, shoulder 80 and flange 81 are so designed that fluid going through the pilot clearance can pass freely irrespective of the position of pilot valve member 51a. Inasmuch as the annular pilot clearance inside of skirt 43a will have substantial fluid flow resistance, the clearance at shoulder 80 and flange 81 need not be large while still permitting relatively free flow. Thus small passages may be drilled through flange 81 or stop means may be provided to prevent flange 81 from sitting snugly against shoulder 80.

Plug 23a has bore 27a connecting plug recess 25a and outlet 12a. This will permit the check valve to have a more delicate response.

Because of valve insert 75, a wide variety of materials for piston 46a is possible. The shoulder and flange construction, together with the sleeve arrangement, provides a lost motion connection between the pilot valve member 51a and the entire piston assembly, including piston 46a and sleeve 78. Thus, in case the main valve sticks, a jar of the entire piston assembly, when the shoulder and flange engage, will aid in opening the main valve. Furthermore, this lost motion arrangement permits piston opening of the main valve through the coupling with the pilot valve member in the event that the fluid inlet pressure is too low for pilot valve operation. This lost motion arrangement has a further advantage, in that chattering of the valve under certain conditions existing at the inlet or at the pilot valve control is eliminated.

Where an electromagnetic control is used, as illustrated, it is desirable to have sleeve 78, or at least shoulder 80, of nonmagnetic material. This is to eliminate the possibility of residual magnetism holding the entire piston assembly and sleeve in its up position, this corresponding to an open valve position. As a further precaution, the clearance between the opposed conical faces of the armature and solenoid core may be made smaller than the clearance between shoulder 80 and the opposed faces of base plate 40a. Thus, armature 51a will stop before the piston assembly has moved to the uppermost position.

Referring now to Fig. 3, there is shown a modified piston which may be used in place of piston 46 in Figs. 1 and 2. In Fig. 3, piston 80 has axial channel 81 therethrough, extending between top face 82 and bottom face 83. Channel 81 is reduced at 84 to provide a pilot valve seat. Bottom face 83 of the piston may have valve insert 85 of any suitable material, such as rubber, nylon, Teflon, Kel-F or any other desired material. Piston 80 itself may be of any desired material, such as Bakelite or other rigid plastic material (including rigid nylon), or may be of glass or other ceramic or of metal. Assuming that piston 80 is of nonmagnetic material, annular insert 87 of ferromagnetic material may be provided at the top end of the piston. Ferromagnetic insert 87, which may be of soft iron, will cooperate with the magnetic circuit of the electromagnetic control in Figs. 1 and 2 so that, when the piston is in its topmost position, this corresponding to maximum opening of the main valve, insert 87 will form part of the magnetic circuit. This construction functions generally in the same manner as the construction of Fig. 4, in permitting main valve opening at low or zero inlet pressure. Thus, any current through the winding of the electromagnet for maintaining the valve open may be reduced.

If desired, the cooperating opposed surfaces of insert 87 and face of base plate 40 may be shaped, such as by bevelling, to increase the magnetic pull on the valve member in the fully open or fully closed positions.

What is claimed is:

1. A pilot valve construction comprising a valve body having an inlet and outlet separated by a partition having a passage therethrough, said partition having a high pressure side communicating directly with the inlet, said body providing a cylindrical piston chamber at the high pressure side of the partition, a piston slidable in said chamber having one end adjacent the high pressure side of the partition, pressure responsive means at said one end of said piston tending to slide said piston in said chamber in one direction only in response to said inlet pressure, said piston being of non-magnetic material but having an annular ferromagnetic member at the other end thereof, said piston chamber including a cylindrical portion fitting around a portion of said piston intermediate the two piston ends, said piston fitting portion cooperating with the piston exterior to provide a high resistance fluid leakage path from said one end of the piston along the outside of the piston to the other end of the piston, means at said one end of the piston cooperating with the high pressure end of the partition aperture to provide valve action, said piston being movable in said one direction away from the partition for valve opening, said piston having an axial passage end to end with said passage terminating opposite the partition passage, said piston passage having a fluid flow resistance substantially less than that of the high resistance fluid leakage path, a pilot valve member having at least a portion thereof of ferromagnetic material and cooperating with the end of the piston passage at the other end of the piston, electromagnetic means having a magnetic circuit formed in part by said ferromagnetic pilot valve member, said pilot valve, when open, permitting fluid flow from a fluid source under pressure to pass from the intake, around the piston from one end to the other end, thence through the pilot valve and through the piston passage to the outlet, said piston being subject to a pressure differential at the two ends thereof causing the piston to be moved in said one direction to pass fluid, said piston having its annular ferromagnetic portion functioning as part of the magnetic circuit of the electromagnetic means whereby movement of said piston is magnetically assisted and may be retained efficiently in its open position, said valve body having an aperture therethrough opposite the low pressure end of the partition passage, a plug for said aperture and a check valve supported in said plug for cooperation with the low pressure end of the partition passage functioning as a check valve seat, and a spring for said check valve adapted to bias said check valve toward said check valve seat, said check valve adapted to produce a back pressure at said other end of said piston to thus prevent a high pressure differential across said piston when said pilot valve is opened.

2. A pilot valve construction comprising a valve body having an inlet and outlet separated by a partition having a passage therethrough, said partition having a high pressure side communicating directly with the inlet, said body providing a cylindrical piston chamber at the high pressure side of the partition, a piston slidable in said chamber and having one end adjacent the high pressure side of the partition, pressure responsive means at said one end of said piston tending to slide said piston in said chamber in one direction only in response to said inlet pressure, said piston chamber including a cylindrical portion fitting around a portion of said piston intermediate the two piston ends, said piston fitting portion cooperating with the piston to provide a high resistance fluid leakage path from said one end of the piston to the other end thereof, means at said one end of the piston cooperating with the high pressure end of the partition aperture to provide a valve action, said piston being movable in said one direction away from the partition for valve opening, said piston having an axial passage end to end with said passage terminating opposite the partition passage, said piston passage having a fluid flow resistance substantially less than that of the high resistance fluid leakage path, a pilot valve member cooperating with the end of the piston passage at the other end of the piston, means for operating said pilot valve member, said pilot valve, when open, permitting fluid flow from a fluid source under pressure to pass from the intake, around the piston from said one end to the other end, thence through the pilot valve and through the piston passage to the outlet, said piston being subject to a pressure differential at the two ends thereof causing the piston to be moved to an open position, means additional to said fluid pressure differential for transmitting directly to said main valve member a force tending to move said main valve member from a closed valve position when said pilot valve member itself is moved from a closed position, and a check valve supported in said housing provided for cooperation with the low pressure end of the partition passage which functions as a check valve seat, and a spring for said check valve adapted to bias said check valve toward said check valve seat, said check valve adapted to produce a back pressure at said other end of said piston to thus prevent a high pressure differential across said piston when said pilot valve is opened.

3. The construction according to claim 2 wherein lost motion connecting means are provided between said pilot valve member and main valve member to provide said force-transmitting means.

4. The construction according to claim 2 wherein electromagnetic means are provided for moving said pilot valve member away from a closed position, said pilot valve member forming part of an armature for said electromagnetic means and wherein said main valve member has at least a portion thereof of ferromagnetic material forming part of the magnetic circuit of said electromagnetic means, said main valve member being urged away from a closed valve position when said electromagnetic means is energized for moving said pilot valve member away from a closed position to provide said force-transmitting means.

5. A pilot valve construction comprising a valve body having a fluid inlet and fluid outlet separated by a partition having a passage therethrough, said partition having a high pressure side communicating directly with the inlet and having a low pressure side communicating directly with the outlet, said body providing a cylindrical piston chamber at the high pressure side of the partition, a piston slidable in said chamber, pressure responsive means at one end of said piston tending to slide said piston in said chamber in one direction only in response to said inlet pressure, said piston chamber including a cylindrical portion fitting around a portion of said piston intermediate the two piston ends, said piston fitting portion cooperating with the piston to provide a high resistance fluid leakage path from said one end of the piston to the other end thereof, means at said one end of the piston cooperating with the high pressure end of the partition passage to provide a valve action, said piston being movable away from the partition in said one direction for valve opening, said piston having an axial passage end to end with said passage terminating opposite the partition passage, said piston passage having a fluid flow resistance substantially less than that of the high resistance fluid leakage path, a pilot valve member cooperating with the end of the piston passage at the other end of the piston, means for operating said pilot valve member, said pilot valve, when open, permitting fluid flow from said inlet around the piston from said one end to said other end, thence through the pilot valve and through the piston passage to the outlet, said piston being subject to a pressure differential at the two ends thereof causing the piston to be moved in said one direction to pass fluid, and a check valve supported in said housing provided for cooperation with the low pressure end of the partition passage which functions as a check valve seat, and a spring for said check valve adapted to bias said check valve toward said check valve seat, said check valve adapted to produce a back pressure at said other end of said piston to thus prevent a high pressure differential across said piston when said pilot valve is opened.

6. The construction according to claim 5 wherein said piston has an insert at said one end for cooperation with the valve seat at the high pressure side of the partition, said insert being of a suitable material for functioning as a valve against said valve seat.

References Cited in the file of this patent

UNITED STATES PATENTS

| | | |
|---|---|---|
| 165,791 | Clemens | July 20, 1875 |
| 1,019,724 | Polizzi et al | Mar. 5, 1912 |
| 1,694,625 | Roberts | Dec. 11, 1928 |
| 2,188,391 | Haynes | Jan. 30, 1940 |
| 2,225,838 | Miller | Dec. 24, 1940 |
| 2,708,092 | Smith | May 10, 1955 |
| 2,768,643 | Acomb | Oct. 30, 1956 |
| 2,793,654 | Biermann | May 28, 1957 |
| 2,853,097 | Davies | Sept. 23, 1958 |

FOREIGN PATENTS

| | | |
|---|---|---|
| 901,783 | France | Nov. 13, 1944 |
| 1,021,143 | France | Nov. 26, 1952 |